United States Patent
Sorensen

(10) Patent No.: US 12,017,416 B2
(45) Date of Patent: Jun. 25, 2024

(54) METHOD OF FASTENING A JOINING INSERT TO A WIND TURBINE ROTOR BLADE ELEMENT

(71) Applicant: Nordex Blade Technology Centre ApS, Stenstrup (DK)

(72) Inventor: Flemming Sorensen, Svendborg (DK)

(73) Assignee: Nordex Blade Technology Centre ApS, Stenstrup (DK)

(*) Notice: Subject to any disclaimer, the term of this patent is extended or adjusted under 35 U.S.C. 154(b) by 0 days.

(21) Appl. No.: 18/540,599

(22) Filed: Dec. 14, 2023

(65) Prior Publication Data
US 2024/0109259 A1   Apr. 4, 2024

Related U.S. Application Data

(63) Continuation of application No. PCT/EP2022/067149, filed on Jun. 23, 2022.

(30) Foreign Application Priority Data

Jun. 24, 2021 (EP) ..................................... 21181540

(51) Int. Cl.
  *B29C 65/54* (2006.01)
  *B29C 65/48* (2006.01)
  *B29L 31/08* (2006.01)
(52) U.S. Cl.
  CPC .......... *B29C 65/544* (2013.01); *B29C 65/483* (2013.01); *B29L 2031/085* (2013.01)
(58) Field of Classification Search
  None
  See application file for complete search history.

(56) References Cited

U.S. PATENT DOCUMENTS

| 2014/0186189 A1* | 7/2014 | Stege .................... F03D 1/0675 264/261 |
| 2015/0071701 A1 | 3/2015 | Raina et al. |

(Continued)

FOREIGN PATENT DOCUMENTS

| DE | 10 2019 002 372 A1 | 10/2020 |
| ES | 2 393 865 A1 | 12/2012 |

(Continued)

OTHER PUBLICATIONS

International Preliminary Report on Patentability and Written Opinion of the International Searching Authority dated Oct. 21, 2022 for international application PCT/EP2022/067149 on which this application is based.

(Continued)

*Primary Examiner* — Jacob T Minskey
*Assistant Examiner* — Adrianna N Konves
(74) *Attorney, Agent, or Firm* — Walter Ottesen, P.A.

(57) ABSTRACT

A method of fastening a joining insert to a wind turbine rotor blade element, the method including: providing a wind turbine rotor blade element of a fiber-reinforced composite material, the rotor blade element having a joining surface and a blind hole, the blind hole having a proximal end at the joining surface and a distal end within the fiber-reinforced composite material; forming a channel through the fiber-reinforced composite material, the channel connecting the distal end of the blind hole to a channel opening at an inner and/or outer surface of the rotor blade element; placing a joining insert in the blind hole; filling a space between the joining insert and the blind hole with a liquid plastics material in a vacuum infusion process, wherein the channel opening is connected either to a liquid plastics material supply line or to a process suction line; curing the liquid plastics material.

12 Claims, 2 Drawing Sheets

(56) References Cited

U.S. PATENT DOCUMENTS

2019/0283347 A1 9/2019 Walker et al.
2022/0195982 A1 6/2022 Heydlauff et al.

FOREIGN PATENT DOCUMENTS

WO 2015/034708 A1 3/2015
WO 2019/178476 A1 9/2019
WO 2020/193753 A1 10/2020

OTHER PUBLICATIONS

International Search Report of the European Patent Office dated Oct. 21, 2022 for international application PCT/EP2022/067149 on which this application is based.
Written Opinion of the International Searching Authority dated Oct. 21, 2022 for international application PCT/EP2022/067149 on which this application is based.

* cited by examiner

METHOD OF FASTENING A JOINING INSERT TO A WIND TURBINE ROTOR BLADE ELEMENT

CROSS REFERENCE TO RELATED APPLICATIONS

This application is a continuation application of international patent application PCT/EP2022/067149, filed Jun. 23, 2022, designating the United States and claiming priority from European application 21181540.2, filed Jun. 24, 2021, and the entire content of both applications is incorporated herein by reference.

TECHNICAL FIELD

The disclosure relates to a method of fastening a joining insert to a wind turbine rotor blade element of a fiber-reinforced composite material. The joining insert may, for example, be configured for receiving a threaded bolt used for assembling the wind turbine rotor blade element to a wind turbine rotor hub or to another wind turbine rotor blade element.

BACKGROUND

For connecting a wind turbine rotor blade element of a fiber-reinforced composite material to a wind turbine rotor hub or to another wind turbine rotor blade element, in particular when connecting two longitudinal sections of a wind turbine rotor blade, it is known to anchor joining inserts such as bolts or sleeves in the fiber-reinforced composite material of the wind turbine rotor blade element.

To this end, it is known to place the joining inserts in a lay-up of reinforcing fibers in a manufacturing mold, to add a liquid plastics material in a vacuum infusion process, and to embed the joining inserts and the reinforcing fibers in a matrix material by curing the liquid plastics material. In this way, the integrity of the reinforcing fibers can be maintained. The document US 2019/0283347 shows a specific example of this well-known process, wherein a process suction line is connected to a passage formed in a root plate of the mold.

In the alternative, it is known to first manufacture the wind turbine rotor blade element of a fiber-reinforced composite material, and to then drill a hole in the fiber-reinforced composite material. In a third step, a joining element can be inserted and fastened in the hole. Following this approach, the document US 2015/0071701 suggests inserting a joining insert in a blind hole formed in a fiber-reinforced composite material of a wind turbine rotor blade element, and sealing a gap between the fiber-reinforced composite material and the joining insert at a proximal end of the blind hole. A liquid plastics material supply line and a process suction line are guided through the sleeve to a distal end of the blind hole, and liquid plastics material is supplied in a vacuum infusion process.

The document DE 10 2019 002 372 A1 discloses a similar process, wherein two process suction lines are in fluid communication with the space to be filled with the liquid plastics material, one of the process suction lines ending at a distal end of the blind hole, the other one ending at a proximal end of the blind hole. The document ES 2 393 865 A1 shows a method of fastening an insert to a part made from a composite material, in which a hole is made in the part, leaving a clearance in relation to the shape of the insert to be placed. A sleeve woven with natural and/or synthetic fibers is disposed on the insert. The insert is introduced together with the sleeve into the hole. Resin is infused into the cavity between the insert and the wall of the hole in order to secure the insert to the wall of the hole.

The document US 2022/0195982 describes a method of fastening a joining insert to a wind turbine rotor blade element made of a fiber-reinforced composite material. The wind turbine rotor blade element has a joining surface and blind hole with a proximal end and a distal end. A joining insert is placed in the blind hole, a space between the joining insert and the blind hole is filled with a liquid plastics material in a vacuum infusion process, and the liquid plastics material is cured.

It is an object of the disclosure to provide a method of fastening a joining insert to a wind turbine rotor blade element, wherein the method can be carried out with simple tools and in a more reliable manner.

This object is, for example, achieved by a method of fastening a joining insert to a wind turbine rotor blade element, wherein the method includes:

providing a wind turbine rotor blade element of a fiber-reinforced composite material, the wind turbine rotor blade element including a joining surface and a blind hole, the blind hole having a proximal end at the joining surface and a distal end within the fiber-reinforced composite material, forming at least one channel through the fiber-reinforced composite material, the at least one channel connecting the distal end of the blind hole to a channel opening at an inner and/or outer surface of the wind turbine rotor blade element, placing a joining insert in the blind hole, filling a space between the joining insert and the blind hole with a liquid plastics material in a vacuum infusion process, wherein said channel opening is connected either to a liquid plastics material supply line or to a process suction line, curing the liquid plastics material.

The wind turbine rotor blade element includes or essentially consists of a fiber-reinforced composite material, such as glass fibers and/or carbon fibers and/or any other suitable reinforcing fibers embedded in a cured matrix material, in particular based on epoxy or polyester resin. The wind turbine rotor blade element has a joining surface which, when the wind turbine rotor blade element is connected to another element such as a wind turbine rotor blade hub or another wind turbine rotor blade element, is facing this other element. The joining surface may then be in direct or indirect contact with the other element.

The blind hole of the wind turbine rotor blade element has an open end at the joining surface, referred to as the proximal end, and a distal, generally closed end within the fiber-reinforced composite material. The blind hole serves to receive the joining insert. It may be formed within the wind turbine rotor blade element in any way, for example by machining the wind turbine rotor blade element after the fiber-reinforced composite material has cured, in particular by drilling, or by arranging the reinforcing fibers around the blind hole or a respective placeholder before curing of a matrix material. In the latter case, the placeholder can be removed in particular after the fiber-reinforced composite material has cured.

In accordance with the disclosure, at least one channel is formed through the fiber-reinforced composite material, the at least one channel connecting the distal end of the blind hole to a channel opening at an inner and/or outer surface of the wind turbine rotor blade element. This can be done in particular after the fiber-reinforced composite material has cured, for example, by drilling. The inner/and or outer surface may be any surface of the wind turbine rotor blade element outside of the blind hole. The terms "inner" and "outer" refer to the arrangement of the surface exhibiting the channel opening with regard to the position of the wind turbine blade element in use. For example, the surface may point towards an inner cavity of the wind turbine rotor blade and may therefore be regarded as an inner surface. When the surface points to an outside of the wind turbine rotor blade, it may be regarded as an outer surface. In particular, this outer surface may form a part of an aerodynamic surface of the wind turbine rotor blade. The wind turbine rotor blade element may have a wall thickness defined between the inner surface and the outer surface.

If more than one channel is used, the channels may end at substantially the same position or at different positions at the distal end of the blind hole, in particular at different circumferential positions. The channels may begin at a common channel opening, or at different channel openings, for example including at least one channel opening at an inner surface and at least one channel opening at an outer surface of the wind turbine rotor blade element. One may connect all of the channels to a process suction line or to a liquid plastics material supply line. However, it is also possible to connect at least one channel opening to a process suction line and at least one channel opening to a liquid plastics material supply line.

In any event, the at least one channel provides access to the distal end of the blind hole through the channel opening in the inner and/or outer surface. This access is employed in the vacuum infusion process, either for removing air from the space between the joining insert and the blind hole through the process suction line, or for supplying a liquid plastics material through the liquid plastics material supply line into this space. The process suction line or the liquid plastics material supply line can be connected to the channel opening by any suitable means, for example by arranging an outlet/inlet of the respective line within the channel opening or close thereto and forming a vacuum seal, for example, with a plastic film and/or an adhesive tape. Once the liquid plastics material has cured, the joining insert is integrated in the fiber-reinforced composite material and fastened to the wind turbine rotor blade element.

The channel formed through the fiber-reinforced composite material provides an easy and reliable access to the blind hole, so that an inclusion of air at the distal end of the blind hole can be prevented. The channel may have a relatively small cross section, so that it does not affect the stability and integrity of the fiber-reinforced composite material. The at least one channel may be filled at least in part or in total with the liquid plastics material, so that after curing of the liquid plastics material, no openings or other significant impairments remain in the fiber-reinforced composite material.

Another important advantage of various methods according to the disclosure is that no complex specific tools are required for obtaining access to the distal end of the blind hole. When using any of the prior art solutions having separate conduits arranged within the blind hole, these conduits will be filled with the liquid plastics material and will typically need to be disposed of after one-time use.

According to an aspect, the joining insert is a sleeve including a proximal end, a distal end and an inner thread for receiving a threaded bolt. The sleeve may have a generally cylindrical shape. A circumferential outer surface of the sleeve may be cylindrical, however, it may also have a varying diameter, for example including a conical shape. The longitudinal axis of the joining insert may be aligned with a longitudinal direction of the wind turbine rotor blade element and/or a longitudinal direction of the wind turbine rotor blade for which the wind turbine rotor blade element is used. Of course, the wind turbine rotor blade element may include any number of joining inserts, for example arranged side-by-side and/or with parallel longitudinal axes. The joining insert may be made of any suitable material, in particular metal, for example steel or aluminum or an alloy of these and/or other metals.

According to an aspect, a gap at the joining surface, between the fiber-reinforced composite material and the joining insert, is covered by a cover plate, the cover plate including a first seal contacting the joining surface, a second seal contacting the joining insert and a passage in fluid communication with a point between the first seal and the second seal, wherein the passage is connected either to a liquid plastics material supply line or to a process suction line. Via the cover plate, a vacuum-tight cavity can easily be formed, which cavity includes the space between the blind hole and the joining insert. For the vacuum infusion process, a "front access" to the blind hole is provided via the passage in the cover plate. When the liquid plastics material has cured, the cover plate can be removed. The gap is then closed and a smooth joining surface can be obtained.

According to an aspect, the cover plate includes a third seal contacting the joining surface such that a holding cavity is formed between the cover plate, the joining surface, the first seal and the third seal, wherein the cover plate defines a passage in fluid communication with the holding cavity, wherein the passage is connected to a holding suction line. When applying vacuum to the holding suction line, the cover plate is pressed against the joining surface, so that no additional holding means may be required. At the same time, the cover plate may help to maintain the joining insert in place.

According to an aspect, the sleeve includes a longitudinal section arranged between the inner thread and the distal end, wherein the longitudinal section has a cylindrical outer surface and a wall thickness that tapers towards the distal end. The tapering wall thickness helps to avoid stress concentrations at the distal end of the sleeve. At the same time, the reduction of the inner diameter of the sleeve makes it easy to close the distal end of the sleeve in order to prevent that liquid plastics material gets into the threaded section of the sleeve.

According to an aspect, the distal end of the sleeve is closed with a plug. The plug may include one or more sealing members for obtaining a vacuum-tight closure of the sleeve. The plug can be fitted into the distal end of the sleeve before the sleeve is placed in the blind hole.

According to an aspect, the cover plate is fastened to the sleeve by a fastener guided through a central opening in the cover plate and screwed into the plug. In particular, the plug may have a blind hole into which the fastener is screwed in, whereas the blind hole may have an inner thread. The cover plate, the sleeve, the plug and the fastener may form a unit which is first assembled and then placed in the blind hole of the wind turbine element so that the cover plate abuts the joining surface. The pre-assembly with the fastener ensures that the plug is pressed against the sleeve so that a tight seal is formed. Another sealing member may be arranged between the cover plate and the proximal end of the sleeve, in particular the previously discussed second seal of the cover plate. Via the fastener, the cover plate is also pressed against the sleeve, so that the other sealing member forms a tight seal as well. If desired, an additional sealing member may be provided at a circumference of the fastener, resting against an inner diameter of the sleeve at the sleeve's proximal end. Such an additional sealing member provides an extra barrier for liquid plastics material, so that the interior of the sleeve and the sleeve's inner thread does not get into contact with the liquid plastics material.

According to an aspect, a plurality of spacers extending radially outwards is provided at the distal end and/or at the proximal end of the sleeve. These spacers maintain a desired radial spacing between the blind hole and the sleeve, in particular so that the sleeve is centered within the blind hole, and/or aligned with a longitudinal axis of the blind hole. The spacers may be attached to the sleeve or fitted into the blind hole in any suitable manner.

According to an aspect, the plurality of spacers at the distal end of the sleeve are formed at a distal end of the plug, the spacers extending beyond the distal end of the sleeve and radially outwards. This will bring the spacers in position automatically when inserting the plug into the sleeve.

According to an aspect, the wind turbine rotor blade element is a wind turbine rotor blade shell member, a spar cap or spar cap segment. The wind turbine rotor blade shell member may in particular be a half-shell or a longitudinal segment of a half-shell. Each of these elements can be equipped with any desired number of joining inserts.

BRIEF DESCRIPTION OF DRAWINGS

The invention will now be described with reference to the drawings wherein.

DETAILED DESCRIPTION

Figure 1A:
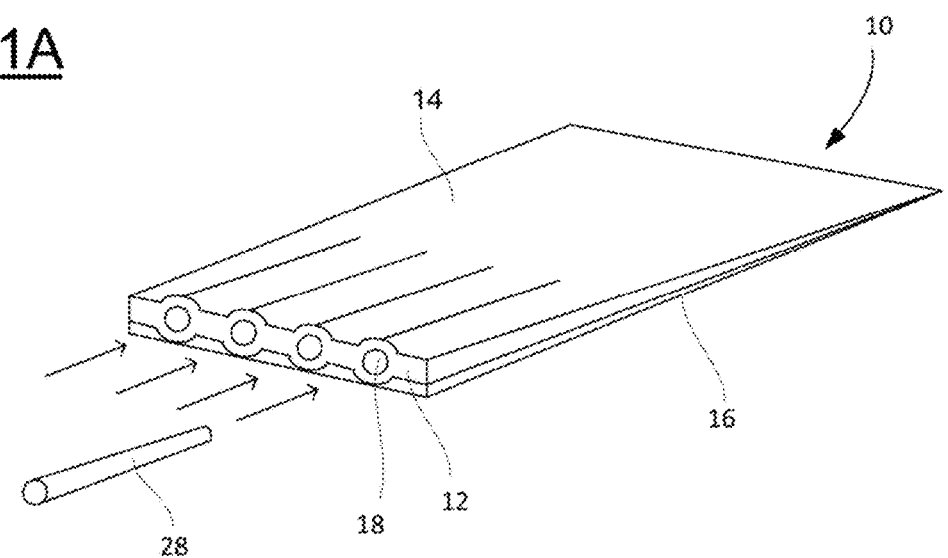
FIGS. 1A and 1B show a wind turbine rotor blade element with a blind hole in a schematic and in a cross-sectional view.

FIG. 1A shows a wind turbine rotor blade element 10 of a fibrous composite material, the wind turbine rotor blade element 10 having a joining surface 12, an outer surface 14, an inner surface 16 and a wall thickness extending between the inner surface 16 and the outer surface 14. The wind turbine element 10 is a wind turbine rotor blade half-shell, only a short section of which is shown. The wind turbine rotor blade element 10 has a blind hole 18 provided for inserting a sleeve 28.

Figure 1B:
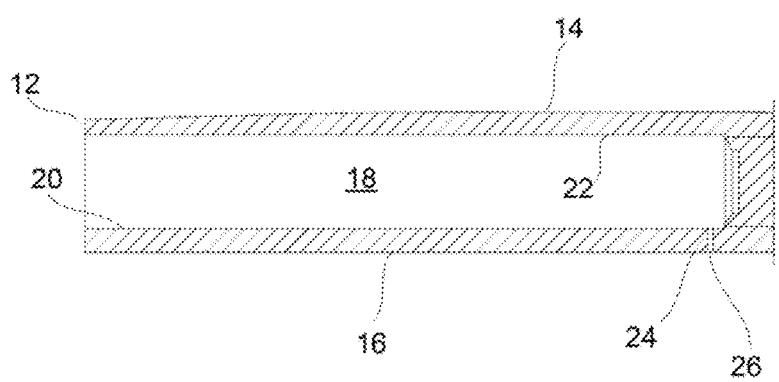

FIG. 1B shows a wind turbine rotor blade element in a cross-sectional view at the location of the blind hole 18. The blind hole 18 has a proximal end 20 at the joining surface 12, a distal end 22 within the fiber-reinforced composite material, and a longitudinal axis substantially aligned with a longitudinal axis of the wind turbine rotor blade half-shell. In the embodiment shown, the blind hole 18 is cylindrical and has a circular cross-section. As used herein, the terms "proximal end" 20 and "distal end" 22 of the blind hole 18 do not refer necessarily exclusively to the ultimate ends of the blind hole 18, but rather to beginning and end sections of the blind hole 18 extending over a certain length. The distal end 22 of the blind hole 18, for example, may extend over the innermost 50% of the total length of the blind hole 18, or over the innermost 25% thereof.

At the distal end 22 of the blind hole 18, a channel 24 is formed through the fiber-reinforced composite material. The channel 24 connects the distal end 22 of the blind hole 18 to a channel opening 26 at the inner surface 16 of the wind turbine rotor blade element 10.

Figure 2:
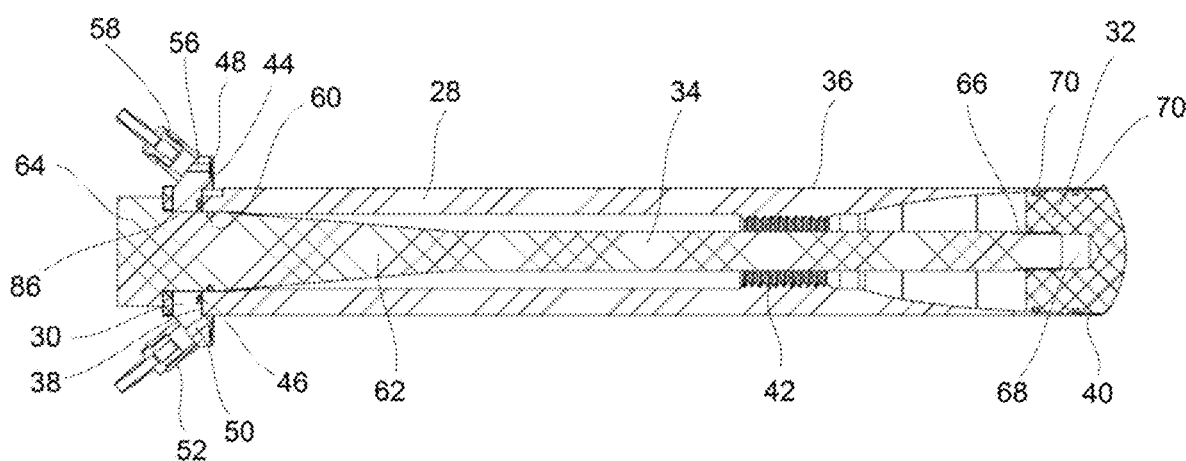
FIG. 2 is a pre-assembled unit in a schematic, cross-sectional view.

FIG. 2 shows a pre-assembled unit including a joining insert in the form of a sleeve 28, a cover plate 30, a plug 32 and a fastener 34. The sleeve 28 has a cylindrical outer surface 36, a proximal end 38, a distal end 40 and an inner thread 42. The inner thread 42 is adapted for receiving a threaded bolt (not shown) for connecting the wind turbine rotor blade element 10 to another element such as a wind turbine rotor blade hub (not shown). From the proximal end 38 up to a proximal end of the inner thread 42, the sleeve 28 has a substantially constant wall thickness. In a longitudinal section between the inner thread 42 and the distal end 40 of the sleeve 28, the inner diameter of the sleeve 28 increases towards the distal end 40 of the sleeve 28, so that the wall thickness of the sleeve 28 tapers significantly.

The cover plate 30 has a generally circular shape with a central through hole through which the fastener 34 is guided. At a surface facing the sleeve 28, the cover plate 30 includes three seals, arranged in concentric circles: A first seal 44 for contacting the joining surface 12, a second seal 46 for contacting the proximal end 38 of the sleeve 28, and a third seal 48 also for contacting the joining surface 12.

Figure 3:
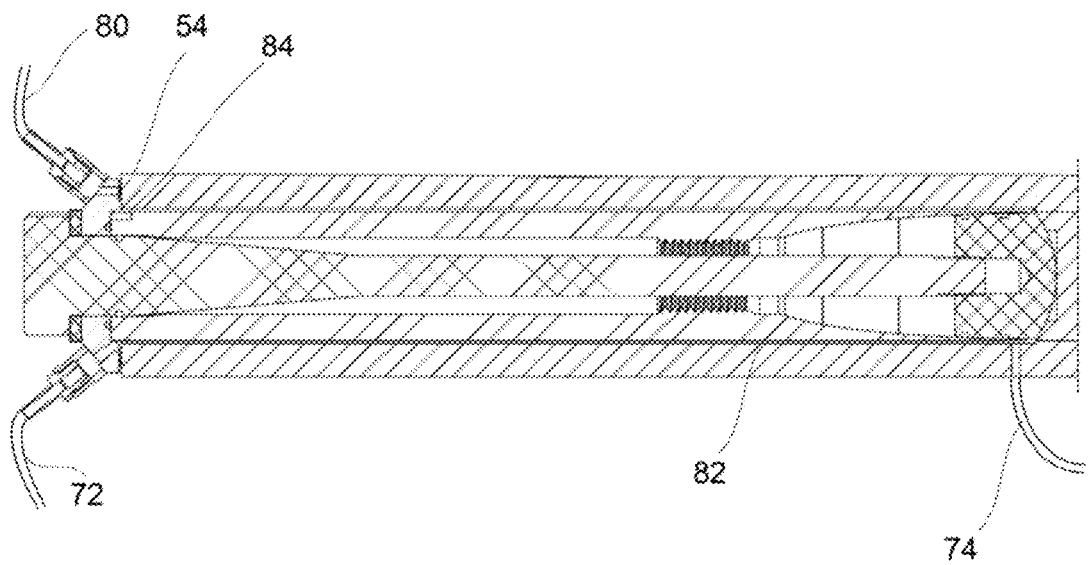
FIG. 3 shows the pre-assembled unit of FIG. 2 placed in the blind hole of the wind turbine rotor blade element of FIGS. 1A and 1B in a schematic, cross-sectional view.

A point between the first seal 44 and the second seal 46 is in fluid communication with a passage 50 leading to a connection section 52 of the cover plate 30 for connecting to a process suction line 72 (see FIG. 3). The third seal 48 is for contacting the joining surface 12 such that a holding cavity 54 (see FIG. 3) is formed between the cover plate 30, the joining surface 12, the first seal 44 and the third seal 48, wherein the cover plate 30 defines another passage 56 which is in fluid communication with the holding cavity 54, wherein the passage 56 can be connected via a connection section 58 of the cover plate 30 to a holding suction line 80 (see FIG. 3).

An additional sealing member 60 is arranged circumferentially between a shank portion 62 of the fastener 34 and an inner diameter of the proximal end 38 of the sleeve 28. The fastener 34 is provided with a head 64 at a proximal end and with an outer thread 66 at a distal end. The outer thread 66 is screwed into an inner thread provided in a blind hole 68 of the plug 32. The plug 32 includes two circumferential sealing members 70 forming a tight seal between the plug 32 and an inner diameter of the distal end 40 of the sleeve 28. The space inside of the sleeve 28 is therefore fully protected against entry of liquid plastics material.

In a next step, the pre-assembled unit shown in FIG. 2 is inserted into the blind hole 18 of the wind turbine element 10 of FIGS. 1A and 1B, leading to the arrangement shown in FIG. 3. In this figure, it can be seen that the distal end 40 of the sleeve 28 is arranged close to the channel 24, which ends in a small free space 82 between the sleeve 28 and the blind hole 18. The cover plate 30 is arranged such that a small, annular gap 84 at the joining surface 12 between the sleeve 28 and the blind hole 18 is fully covered. By applying a holding vacuum to the passage 56, the holding cavity 54 is evacuated so that the pre-assembled unit is safely held in place.

The subsequent vacuum infusion of the liquid plastics material is carried out by evacuating the space 82 between the sleeve 28 and the blind hole 18 via a process suction line 72 attached to the connection section 52, and by supplying a liquid plastics material through a liquid plastics material supply line 74 connected to the channel opening 26.

Figure 4:
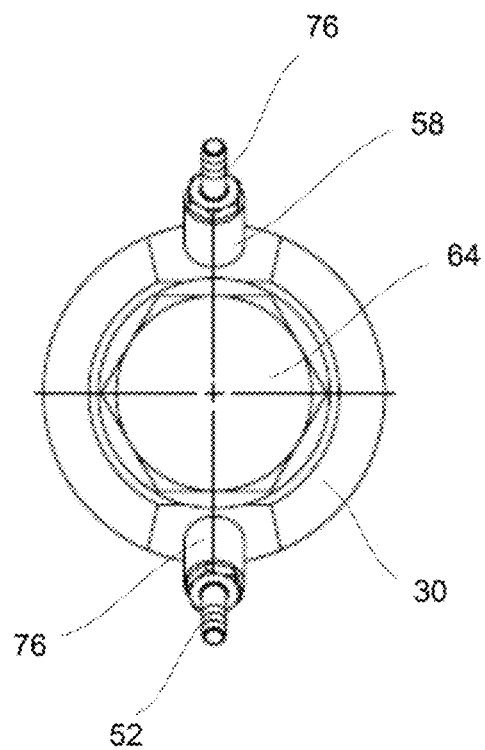
FIG. 4 is a front view of the pre-assembled unit of FIG. 2.

FIG. 4 shows a front view on the hexagonal head 64 of the fastener 34 and the cover plate 30. The connection sections 52, 58 of the cover plate 30 are equipped with a plastic insert 76 each for connecting to the process suction line 72 and to the holding suction line 80 for applying the holding vacuum. The plastic inserts 76 can be removed from the cover plate 30 after the liquid plastics material has cured, so that the cover plate 30 can be re-used once the passage 50 has been cleaned.

Figure 5:
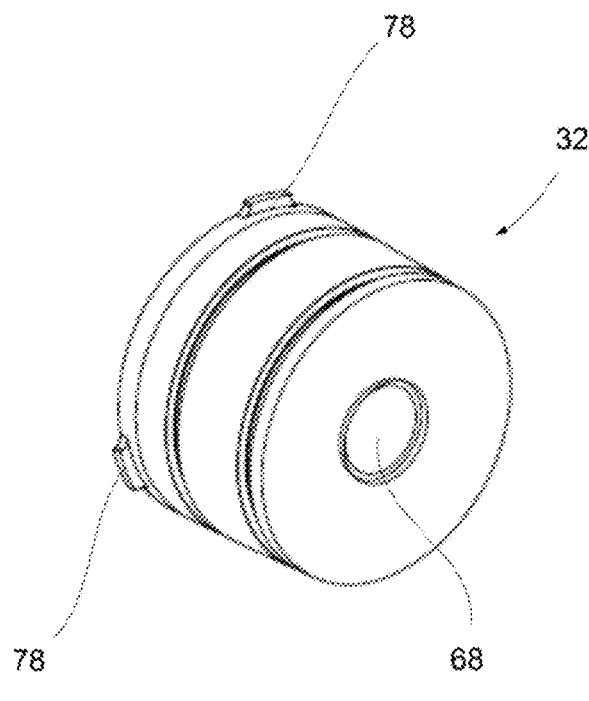
FIG. 5 is a perspective view of a plug.

FIG. 5 shows the plug 32 with the blind hole 68 and two circumferential grooves 86 for receiving the two sealing members 70. The plug 32 has a conical shape. Three spacers 78 extend radially outwards from a distal end of the plug 32. When the plug 32 is fitted in the sleeve 28, the spacers 78 extend beyond the distal end 40 of the sleeve 28.

It is understood that the foregoing description is that of the preferred embodiments of the invention and that various changes and modifications may be made thereto without departing from the spirit and scope of the invention as defined in the appended claims.

LIST OF REFERENCE NUMERALS 10 wind turbine rotor blade element
12 joining surface
14 outer surface
16 inner surface
18 blind hole
20 proximal end
22 distal end
24 channel
26 channel opening
28 sleeve
30 cover plate
32 plug
34 fastener
36 cylindrical outer surface
38 proximal end
40 distal end
42 inner thread
44 first seal
46 second seal
48 third seal
50 passage
52 connection section
54 holding cavity
56 passage
58 connection section
60 additional sealing member
62 shank portion
64 head
66 outer thread
68 blind hole
70 sealing member
72 process suction line
74 liquid plastics material supply line
76 plastic insert
78 spacer
80 holding suction line
82 space
84 gap
86 grooves

The invention claimed is:

1. A method of fastening a joining insert to a wind turbine rotor blade element, the method comprising:
providing the wind turbine rotor blade element of a fiber-reinforced composite material, the wind turbine rotor blade element having a joining surface and defining a blind hole, the blind hole having a proximal end at the joining surface and a distal end within the fiber-reinforced composite material;
forming at least one channel through the fiber-reinforced composite material, the at least one channel connecting the distal end of the blind hole to a channel opening at least at one of an inner surface and an outer surface of the wind turbine rotor blade element;
placing the joining insert in the blind hole;
filling a space between the joining insert and the blind hole with a liquid plastics material in a vacuum infusion process, wherein the channel opening is connected either to a liquid plastics material supply line or to a process suction line; and,
curing the liquid plastics material.

2. The method of claim 1, wherein the joining insert is a sleeve having a proximal end, a distal end and an inner thread for receiving a threaded bolt.

3. The method of claim 1, wherein at the joining surface, a gap between the fiber-reinforced composite material and the joining insert is covered by a cover plate; the cover plate has a first seal contacting the joining surface and a second seal contacting the joining insert; the cover plate defines a first passage in fluid communication with a point between the first seal and the second seal; and, the first passage is connected either to the liquid plastics material supply line or to the process suction line.

4. The method of claim 3, wherein the cover plate further has a third seal contacting the joining surface such that a holding cavity is formed between the cover plate, the joining surface, the first seal, and the third seal; the cover plate defines a second passage in fluid communication with the holding cavity; and, the passage is connected to a holding suction line.

5. The method of claim 2, wherein the sleeve includes a longitudinal section arranged between the inner thread and the distal end; and, the longitudinal section has a cylindrical outer surface and a wall thickness that tapers towards the distal end.

6. The method of claim 2, wherein the distal end of the sleeve is closed with a plug.

7. The method of claim 3, wherein the cover plate is fastened to a sleeve by a fastener guided through a central opening in the cover plate and screwed into a plug that closes a distal end of the sleeve.

8. The method of claim 3, wherein the joining insert is a sleeve having a proximal end, a distal end and an inner thread for receiving a threaded bolt; and, the cover plate is fastened to the sleeve by a fastener guided through a central opening in the cover plate and screwed into a plug that closes the distal end of the sleeve.

9. The method of claim 2, wherein a plurality of spacers extending radially outwards is provided at least at one of the distal end and the proximal end of the sleeve.

10. The method of claim 6, wherein a plurality of spacers extending radially outwards is provided at least at one of the distal end and the proximal end of the sleeve; and, the plurality of spacers at the distal end of the sleeve are formed at a distal end of the plug, the spacers extending beyond the distal end of the sleeve and radially outwards.

11. The method of claim 7, wherein a plurality of spacers extending radially outwards is provided at least at one of the distal end and a proximal end of the sleeve; and, the plurality of spacers at the distal end of the sleeve are formed at a distal end of the plug, the spacers extending beyond the distal end of the sleeve and radially outwards.

12. The method of claim 1, wherein the wind turbine rotor blade element is a wind turbine rotor blade shell member, a spar cap, or a spar cap segment.

\* \* \* \* \*